US007996841B2

(12) United States Patent
Smith et al.

(10) Patent No.: US 7,996,841 B2
(45) Date of Patent: *Aug. 9, 2011

(54) BUILDING ALTERNATIVE VIEWS OF NAME SPACES

(75) Inventors: Frederick J. Smith, Redmond, WA (US); Jeff L. Havens, Issaquah, WA (US); Madhusudhan Talluri, Bellevue, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1391 days.

This patent is subject to a terminal disclaimer.

(21) Appl. No.: 11/301,065

(22) Filed: Dec. 12, 2005

(65) Prior Publication Data

US 2007/0134070 A1    Jun. 14, 2007

(51) Int. Cl.
*G06F 9/46* (2006.01)
(52) U.S. Cl. ...................................... 718/104
(58) Field of Classification Search .................. 718/104
See application file for complete search history.

(56) References Cited

U.S. PATENT DOCUMENTS

| 5,214,778 | A | * | 5/1993 | Glider et al. ..................... 714/2 |
| 5,682,530 | A | * | 10/1997 | Shimamura ................... 718/104 |
| 5,923,884 | A | * | 7/1999 | Peyret et al. ................... 717/167 |
| 6,374,286 | B1 | | 4/2002 | Gee et al. |
| 6,529,966 | B1 | * | 3/2003 | Willman et al. ................ 710/10 |
| 6,532,505 | B1 | | 3/2003 | Stracovsky et al. ............ 710/63 |
| 6,961,941 | B1 | | 11/2005 | Nelson et al. |
| 7,103,661 | B2 | | 9/2006 | Klein |
| 7,185,192 | B1 | * | 2/2007 | Kahn ............................. 713/155 |
| 7,188,339 | B2 | | 3/2007 | Qureshi |
| 7,389,512 | B2 | * | 6/2008 | Tucker .......................... 719/313 |
| 7,447,896 | B2 | | 11/2008 | Smith et al. |
| 7,461,080 | B1 | | 12/2008 | Tucker |
| 2001/0004753 | A1 | * | 6/2001 | Dell et al. ........................ 711/5 |
| 2003/0110188 | A1 | | 6/2003 | Howard et al. |
| 2004/0030731 | A1 | | 2/2004 | Iftode et al. |
| 2004/0226015 | A1 | * | 11/2004 | Leonard et al. ............... 718/100 |
| 2005/0021788 | A1 | | 1/2005 | Tucker et al. |
| 2005/0091214 | A1 | | 4/2005 | Probert et al. |

(Continued)

FOREIGN PATENT DOCUMENTS

EP    1 475 703    11/2004

(Continued)

OTHER PUBLICATIONS

Wright, C., Kernel Korner—Unionfs: bringing filesystems Together, *Linux Journal*, 2004, http://www.linuxjournal.com/article/7714, downloaded from the Internet on Apr. 27, 2006, 18 pages.

(Continued)

*Primary Examiner* — Lewis A Bullock, Jr.
*Assistant Examiner* — Blake Kumabe
(74) *Attorney, Agent, or Firm* — Woodcock Washburn LLP

(57) ABSTRACT

A containment mechanism provides for the grouping and isolation of multiple processes running on a single computer using a single instance of the operating system. A system is divided into one or more side-by-side and/or nested spaces enabling the partitioning and controlled sharing of resources by creating different views of hierarchical name spaces by creating a new branch of an existing global system name space or by linking the sub-root level nodes of a new hierarchy to a subset of nodes in an existing global system name space.

19 Claims, 10 Drawing Sheets

U.S. PATENT DOCUMENTS

| | | |
|---|---|---|
| 2005/0091658 A1 | 4/2005 | Kavalam et al. .............. 718/104 |
| 2005/0125537 A1 | 6/2005 | Martins et al. |
| 2006/0075123 A1 | 4/2006 | Burr et al. |
| 2006/0090171 A1 | 4/2006 | Laborczfalvi et al. |
| 2006/0230042 A1* | 10/2006 | Butler et al. ...................... 707/9 |
| 2006/0282658 A1 | 12/2006 | Tang |
| 2007/0134069 A1 | 6/2007 | Smith et al. |
| 2007/0136356 A1 | 6/2007 | Smith et al. |
| 2007/0136723 A1 | 6/2007 | Smith et al. |

FOREIGN PATENT DOCUMENTS

| | | |
|---|---|---|
| WO | WO 2004/027613 A2 | 4/2004 |
| WO | WO 2004/068722 A2 | 8/2004 |
| WO | WO 2007/070535 | 6/2007 |
| WO | WO 2007/070555 | 6/2007 |

OTHER PUBLICATIONS

Kamp et al., "Jails: Confining the omnipotent root," The FreeBSD Project, downloaded May 15, 2009, pp. 1-15.

"System Administration Guide: Solaris Containers Resource Management and Solaris Zones," Sun Microsystem, Inc., 2009, pp. 1-506.

* cited by examiner

300

SYSTEM HIERARCHY 401

BUILDING ALTERNATIVE VIEWS OF NAME SPACES

CROSS-REFERENCE TO RELATED CASES

This application is related in subject matter to U.S. patent application Ser. No. 11/301,093, entitled "Using Virtual Hierarchies to Build Alternative Namespaces" filed herewith, U.S. patent application Ser. No. 11/301,066, entitled "OS Mini Boot for Running Multiple Environments" filed herewith, U.S. patent application Ser. No. 11/301,071, entitled "Use of Rules Engine to Build Namespaces" filed herewith, and U.S. patent application Ser. No. 11/301,072, entitled "Mechanism for Drivers to Create Alternate Namespaces" filed herewith.

BACKGROUND

When a single computer is used to run multiple workloads, a balance should be struck between isolation of applications and the cost of using and administering the application-isolating system. Applications should ideally be isolated from each other so that the workload of one application does not interfere with the operation or use of resources of another application. On the other hand, the system should be flexible and manageable to reduce the cost of using and administering the system. Ideally, the system should be able to selectively share resources while maintaining application isolation. Typically, however, all processes running under the same user account have the same view of system resources. The lack of isolation of the applications running on a particular computer contributes to application fragility, application incompatibility, security problems and the inability to run conflicting applications on the same machine.

A number of different solutions have been proposed which address one or more aspects of the problems discussed above. One way to isolate applications running on the same machine is to run the applications on different "virtual machines". A virtual machine (VM) enables multiple instances of an operating system (OS) to run concurrently on a single machine. A VM is a logical instance of a physical machine, that is, a virtual machine provides to the operating system software an abstraction of a machine at the level of the hardware: that is, at the level of the central processing unit (CPU), controller, memory, and so on. Each logical instance has its own operating system instance with its own security context and its own isolated hardware resources so that each operating system instance appears to the user or observer to be an independent machine. VMs are typically implemented to maximize hardware utilization. A VM provides isolation at the level of the machine but within the virtual machine, no provisions for isolating applications running on the same VM are provided for by known VM implementations.

Other known proposed solutions to aspects of the problems described above include SUN MICROSYSTEM'S SOLARIS Zones, jails for UNIX BSD and LINUX, the VServers project for LINUX, SWSOFT'S VIRTUOZZO, web hosting solutions from ENSIM and SPHERA, and software available from POLICYMAKER, and SOFTRICITY.

Another approach that addresses aspects of application isolation is hardware partitioning. A multi-processor machine is divided into sub-machines, each sub-machine booting an independent copy of the OS. Hardware partitioning typically only provides constrained resource allocation mechanisms (e.g., per-CPU allocation), does not enable input/output (IO) sharing and is typically limited to high-end servers.

Hence, in many systems, limited points of containment in the system exist at the operating system process level and at the machine boundary of the operating system itself, but in between these levels, security controls such as Access Control Lists (ACLs) and privileges associated with the identity of the user running the application are used to control process access to resources. There are a number of drawbacks associated with this model. Because access to system resources is associated with the identity of the user running the application rather than with the application itself, the application may have access to more resources than the application needs. Because multiple applications can modify the same files, incompatibility between applications can result. There are a number of other well-known problems as well.

There is no known easy and robust solution using known mechanisms that enables applications to be isolated while still allowing controlled sharing of resources. It would be helpful if there were a mechanism that allowed an application, process, group of applications or group of processes running on a single machine to be isolated using a single operating system instance while enabling controlled sharing of resources.

SUMMARY

An intra-operating system isolation/containment mechanism called herein a silo provides for the grouping and isolation of multiple processes running on a single computer using a single instance of the operating system. A single instance of the operating system divides the system into multiple side-by-side and/or nested isolated environments (silos) enabling the partitioning and controlled sharing of resources by providing a view of a system name space to processes executing within the silos. That is, a single OS image serving the computer employs the mechanism of name space containment to constrain which process, group of processes, application or group of applications can use which resource(s). Restricting access to resources is therefore directly associated with or based on the silo the process or application is placed in because if a process or application is unable to resolve a name used to access a resource, it will be unable to use the resource. More particularly, controlled sharing of resources among the spaces may be implemented via hierarchical name space containment of the registry, object manager, or other hierarchical name space. New points of containment are provided at the process level, group of processes level, application level, or group of applications level. A silo provides an abstraction at the level of a high level operating system—(e.g., at the level of files, directories, objects and semaphores) to the applications and processes within the silo by enabling the applications and processes to run within the silo's view of the system or parent hierarchy.

A silo-specific view of the system hierarchy (or of a parent hierarchy in the case of a nested silo) may be created by creating and exposing a new silo hierarchy or a new branch of an existing system (or parent) hierarchy, some or all of the nodes of which may be linked back to a node or name in a parent silo hierarchy or to a node or name in a global system hierarchy associated with the external system environment in which the silo resides. The new silo hierarchy or branch may be virtual. A virtual hierarchy is volatile. It is not persisted to permanent storage (e.g., is not written to disk or to other stable storage media) but resides only in memory or other volatile media and may be created dynamically as the silo is initiated. When the silo exits, the virtual hierarchy may be discarded. The physical hierarchy in contrast, is permanent (persisted to stable storage) and is independent of the existence or nonexistence of the silo. A silo may be implemented by having the silo provide the root for the processes running in the silo. For example, the silo may provide the root of a virtual directory to be used by a process running in the silo. The root of the silo hierarchy may be the default hierarchy that the applications running in the silo use for starting operations. Thus a silo may be implemented by having the silo provide the root for the processes running in the silo. A process within the silo cannot see or express any names above the silo root. One or more hierarchies may be associated with a silo.

A silo hierarchy may be created by grafting branches from the system hierarchy onto nodes directly or indirectly attached to the silo root associated with the silo. This concept may be applied to hierarchical name spaces such as the registry, the object name space, and others.

For some hierarchical name spaces, a view is created using a mapping function that maps physical nodes in one name space to physical nodes in another. That is, all the sub-root nodes of the silo hierarchy are junctions back to the system hierarchy (or to the parent hierarchy for child silos). This approach may be used for a hierarchy such as the registry. For the silo registry, the grafting operation described above makes a key or a value appear at one or more places within the silo registry.

For other hierarchical name spaces such as but not restricted to those which exist only temporarily in memory or other volatile storage while the system or silo is running, a view of the system name space may be generated by creating a new branch of the system or parent hierarchy for each isolated environment. Junctions may be created via symbolic links. A process running in an isolated environment is only able to create symbolic links within its name space. Similarly, when a symbolic link is resolved for a process running in the isolated environment, it is resolved relative to its view of the system name space. One such hierarchical name space is the object manager name space. A new branch of the physical system hierarchy may be created for each silo in the object manager hierarchy, which is created and stored only in volatile storage. The silo branch provides a view into the system object manager name space for the silo. Normal object manager symbolic links are used to junction to nodes within the object manager hierarchy. To ensure that a process running within a silo does not escape from the silo, when a process in a silo issues a request to create a symbolic link, the target name (the node the link points to) is resolved relative to the silo's name space so that the creation of symbolic links is limited to the silo name space.

DETAILED DESCRIPTION

Overview

Figure 1:
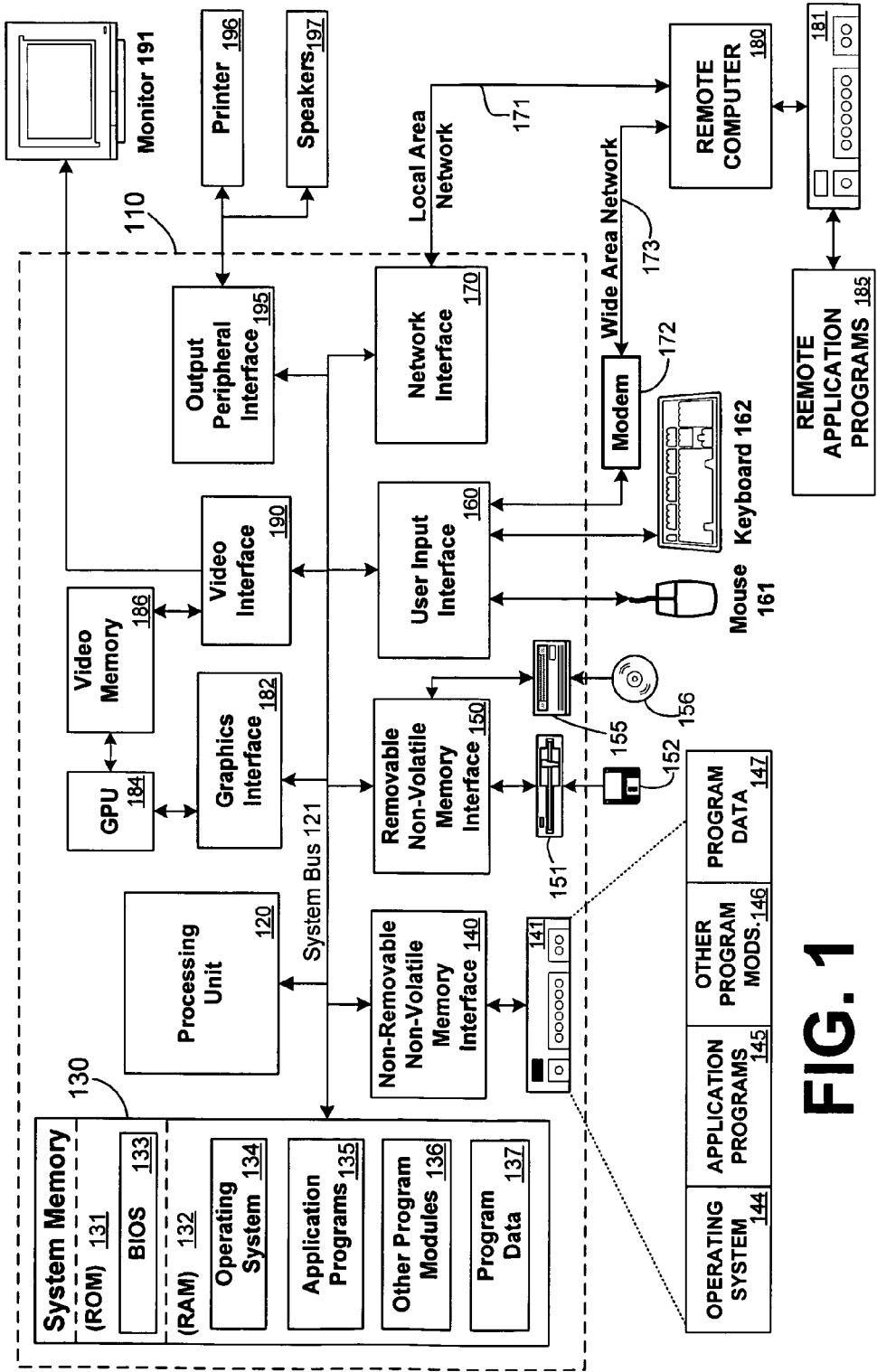
FIG. 1 is a block diagram illustrating an exemplary computing environment in which aspects of the invention may be implemented.

A resource management system controls the use of various system resources such as memory, CPU time, IO bandwidth and so on. One or more of three kinds of links may be used to point to resources: hard links, symbolic links and aliases. A hard link is a reference or pointer to the physical data on a volume. In most file systems, all named files are hard links. The name associated with the file is a label that refers the operating system to the actual data. More than one name can be associated with the same data but the data must exist in the same file system. A symbolic link is a type of link used in Unix, for example, which refers to another file by its pathname. In contrast with hard links, there are no restrictions on where a symbolic link can point, it can refer to a file on another file system, to itself or to a file which does not even exist (detected as a problem only when the link is accessed). An alias is designed to maintain a link to its original file even if the original file is moved or renamed. All of these links are, however, associated with non-volatile directories.

Secure access to resources can be based on access control lists (ALCs) or on capabilities. Most commercial resource management systems, including some Microsoft WINDOWS operating systems, use access control lists to control access to resources. Because of the widespread use of ACL-based permission controls, multiple applications are often allowed to share resources. Access to the resources is based on privileges associated with the identity of the person running the application or process rather than being based on the needs and characteristics of the application itself. This approach can be problematic. For example, a user may have broad access privileges (e.g., administrator status) because some of the programs he runs need that level of access. For example, because program_1 run by user_1 needs access to files one to ten, user_1's access privileges must permit him to access files one to ten. Suppose program_2 only needs access to files one and two. When user_1 runs program_2, program_2 will nevertheless have access to files one to ten, because user_1's privileges allow access to files one to ten. Thus, because file system operations are based on ACL-based permission controls, in general, the file system name space can be and generally is more or less global to all the processes launched by user_1 running on the machine. ACL-based permission controls lead to a number of problems including: a program could waste processing time handling things it should not consider, the presence of a new file that the program is not expecting might cause the program to operate incorrectly, different programs may write or modify the same file, causing interference and so on. This problem is exacerbated because not all programs have the same level of trustworthiness. Program_2 may not be as trustworthy as program_1 but since the user's privileges allow him to access files one to ten, program_2 has access to files one to ten and may maliciously modify them. In addition, there may be occasions when it is desirable to provide different programs different files even though the programs use the same name for the file. Finally, different programs may use the same name but mean different files. Hence, there is a need for better control of shared resources than that which can easily be obtained using ACLs and privileges.

To address the need for a more powerful access control mechanism than that provided for by ACLs, the silo containment mechanism is introduced that enables the creation of a new isolated environment in which a process, program, set of programs or application can run. In some embodiments a view of a system hierarchy is created and associated with the isolated environment. A new physical hierarchy may be created in which nodes of the new hierarchy are mapped to nodes in a physical system hierarchy. The new silo hierarchy provides a view of the global hierarchy for the process, program, set of programs or application running in the silo. The new silo hierarchy is created by joining pieces of the global hierarchy to the leaf nodes of the silo hierarchy, to create a silo-specific view of the system hierarchy. The silo hierarchy is stored in volatile storage (e.g., memory) and has no effect on the system hierarchy. This concept may be applied to hierarchies such as the registry and others.

The registry is a central hierarchical database used in certain operating systems including Microsoft Windows 9x, Windows CE, Windows NT, and Windows 2000. The registry is used to store information necessary to configure the system for one or more users, applications and hardware devices. The registry includes information that the operating system refers to during operation. This information includes data such as profiles for each user, the applications installed on the computer and the types of documents that each can create, property sheet settings for folders and application icons, what hardware exists on the system, and the ports that are being used. The registry might be analogized to a file system optimized for very small files. In the registry, directories are replaced by keys and files are replaced by values.

In some embodiments a view of a system hierarchy is created and associated with the isolated environment. A new branch on the system physical hierarchy may be created. Nodes in the new branch are mapped to nodes in the physical system hierarchy. The new silo branch provides a view of the global hierarchy for the process, program, set of programs or application running in the silo. The new silo branch is created by joining pieces of the global hierarchy to the leaf nodes of the silo branch, to create a silo-specific view of the system hierarchy. The silo hierarchy is stored in volatile storage (e.g., memory). This concept may be applied to hierarchies such as the object manager name space and others.

The object manager provides a resource management support infrastructure that executive subsystems (including the memory manager, I/O manager, and process manager) rely on. One way a program accesses a resource such as a file is to open or create the resource. A resource is typically assigned a name when it is created so that it can be shared. To look up or open an existing shared resource or a global resource (e.g., a file system, disk, or other physical device attached to the system), a program specifies the resource name. Resources (such as files and shared virtual memory) may be represented as object data structures, defined by the object manager. Objects may be implemented as shells that other executive subsystems can fill in so that custom object types can be built. The object manager tracks information that is independent of the type of resource an object represents. The subsystem-specific core of an object contains data relevant to a particular resource.

Creating objects is advantageous because each subsystem does not need to redo work to track the system-related state of an object, look up its resources, charge applications for the memory required to allocate an object, and protect resources with security. By concentrating these functions in the object manager, security code and naming conventions can be shared across subsystems. The object manager creates object types, creates and deletes objects, queries and sets object attributes, and locates objects. An object type stores information common to all objects representing the same type of resource. When an executive subsystem initializes, a function in the object manager is called to define the appropriate object types.

The invention contemplates the presence of a number of silos that are fairly dynamic—that is, the silos may come and go and may change fairly rapidly. When the silo is created, one or more virtual hierarchies for the silo are created in memory. When the silo exits, the virtual hierarchy or hierarchies for the silo are discarded.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Building Alternative Hierarchical Name Spaces

Figure 2:
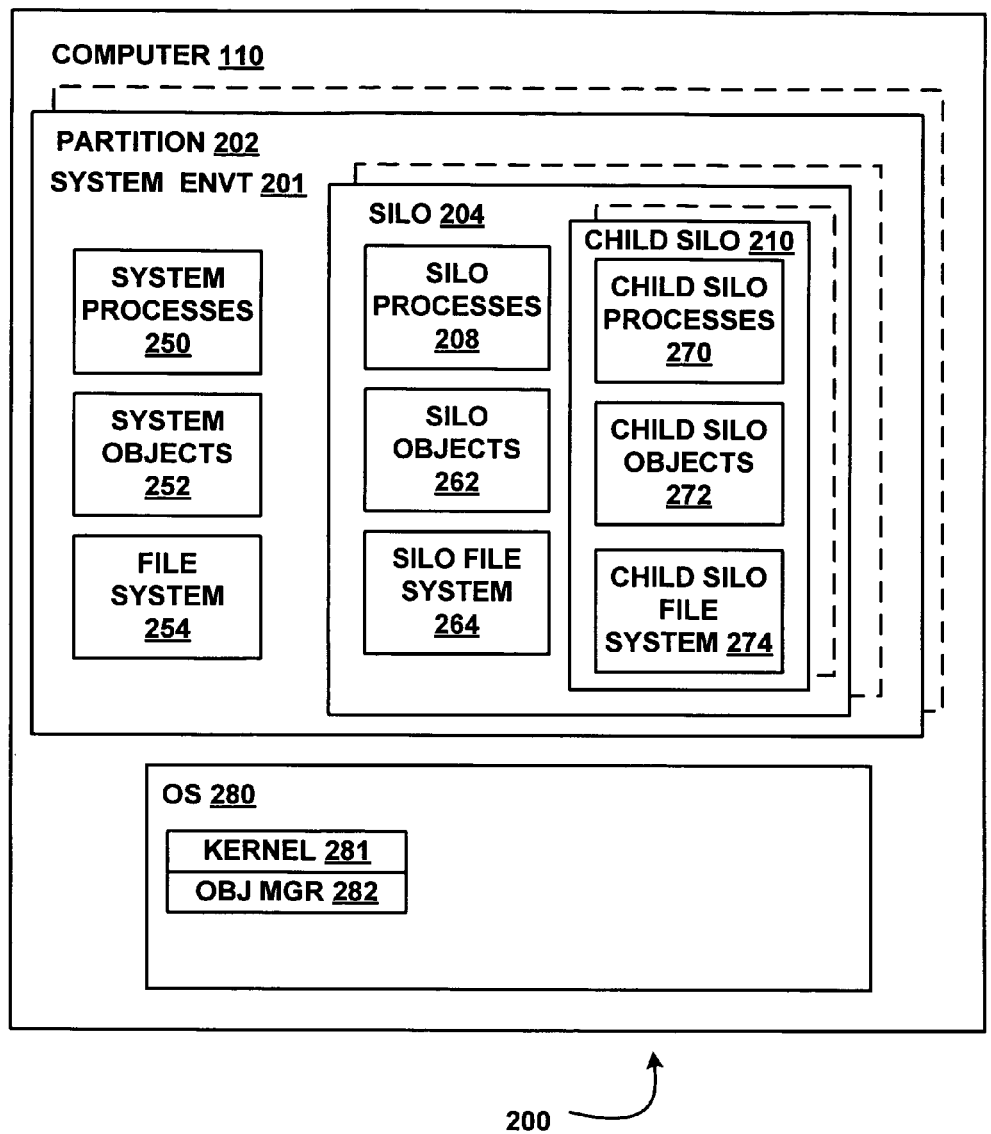
FIG. 2 is a block diagram of a system for creating and using alternative hierarchies to build views of hierarchical name spaces in accordance with some embodiments of the invention.

FIG. 2 is a block diagram illustrating a system for creating and using alternative hierarchical name spaces to restrict access to resources based on the process rather than permissions associated with the user running the process. System 200 may reside on a computer such as the one described above with respect to FIG. 1. System 200 may include one or more partitions such as partition 202, etc. A drive letter abstraction may be provided at the user level to distinguish one partition from another. For example, the path C:\WINDOWS\ may represent a directory WINDOWS on the partition represented by the letter C. Each drive letter or partition may be associated with a hierarchical data structure. Each hierarchy has a root which represents the first or top-most node in the hierarchy. It is the starting point from which all the nodes in the hierarchy originate. As each device may be partitioned into multiple partitions, multiple roots may be associated with a single device. (For example, a user's physical hard disk may be partitioned into multiple logical "disks", each of which have their own "drive letter" and their own root.) A single instance of the operating system images serves all the partitions of the computer in some embodiments of the invention.

Within each partition, system 200 may include a system environment 201 and a number of isolated environments. In some embodiments of the invention, the isolated environments are silos. The system environment 201 may include or be associated with a number of name spaces including but not limited to one or more of: a system processes name space 250, a system objects name space 252 and a file system name space 254. System 200 may also include an operating system 280. The operating system 280 may include one or more operating system components including but not limited to an operating system kernel 281 and an object manager 282. In some embodiments of the invention, the object manager resides within the kernel. System 200 may also include other components not here shown but well known in the art.

System 200 may include one or more side-by-side silos 204, etc. in each partition or associated with each drive letter. Each silo in some embodiments is associated with its own silo process name space, silo object name space and silo file system name space but shares a single operating system instance with all the processes in the system. For example, in FIG. 2, silo 204 is associated with silo processes name space 208, silo objects name space 262 and silo file system name space 264. Silo 204, etc. does not however, have its own operating system instance. That is, for example, silo 204 is served by the same operating system instance (operating system 280) that serves the system environment 201 and any other silos that may exist. Silo 204, etc. may include one or more child silos 210, etc. Silo 210 itself may include one or more child silos and so on to any degree of nesting. Child silo 210 in FIG. 2 is associated with child silo processes name space 270, child silo objects name space 272 and child silo file system name space 274 but is served by the same operating system instance that serve all the other environments. A child silo may be created by a process running in its parent silo. For example, in FIG. 2, a process in silo processes name space 208 may have created child silo 210 by creating a view into the silo 204 name space, as described more fully below. A process may not escape from its silo. For example a process in silo processes name space 208 may not escape from silo 204. Similarly, a child process of child silo processes name space 270 may not escape from child silo 210. Furthermore, the smallest entity capable of being siloed (placed in its own silo) is a process. A sub-process cannot be siloed.

Access to resources is restricted by creating a view of the system hierarchy for a process in an isolated environment such as a silo. In some embodiments, the view is created by creating a silo-specific root node with sub-root nodes directly or indirectly connected to the silo root node. Junctions may be created that connect leaf nodes to nodes in the global hierarchy. The global or system hierarchy may be a physical hierarchy stored in volatile storage. Access to resources may be restricted in some embodiments by creating a view of the system hierarchy in which sub-root nodes are junctions to a subset of nodes in the system physical hierarchy. Another way to restrict access to resources is implemented by adding a silo-specific branch to the system hierarchy. The branch provides a view of the global name space to a process in an isolated environment. Access to resources may be restricted in some embodiments by creating a view of the system hierarchy in which nodes of the silo-specific branch are junctions to a subset of nodes in the system physical hierarchy.

Figure 3:
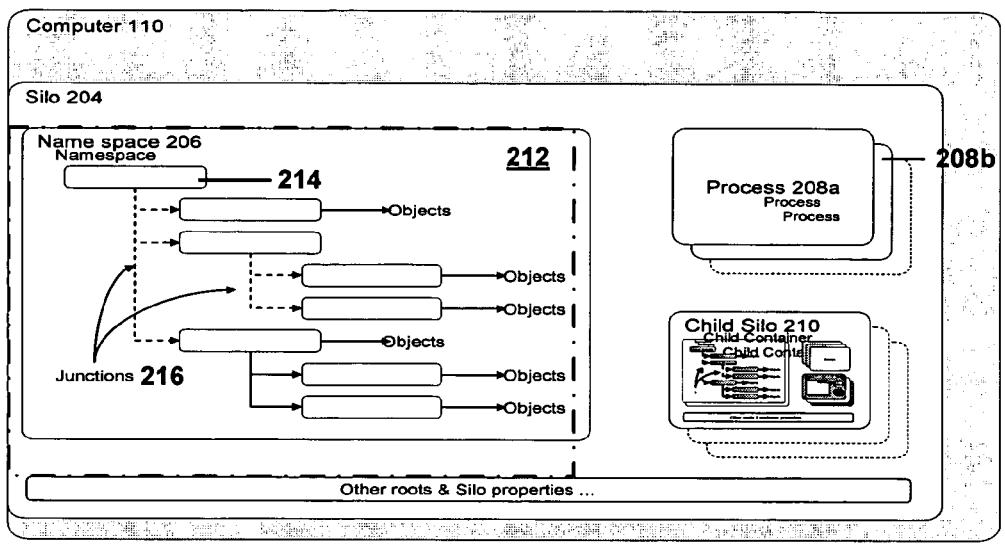
FIG. 3 is another block diagram of a system for creating and using alternative hierarchies to build alternative views of name spaces in accordance with some embodiments of the invention.
Figure 3:
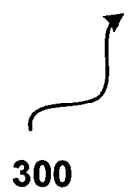

FIG. 3 is a more detailed illustration of a portion 300 of system 200. In FIG. 3, name space 206 of silo 204 on computer 110 may represent the object manager name space, the registry name space, or other hierarchical name spaces. Each name space may have its own silo-specific root. For example, each silo (parent silo 204, child silo 210) may have its own silo root such as silo root 214 for the registry (e.g., the silo hierarchy illustrated within name space 206 for silo 204 may be a registry). The silo hierarchy may or may not have the same set of nodes or entries as the corresponding physical global name space, but typically it does not. The silo hierarchy may include junctions (e.g, junction 216) or links back to the physical name space, which is discussed in more detail with respect to FIGS. 4a-d. The processes in the silo therefore can be given an alternate view of the global name space.

Each silo may be associated with its own root of the object manager hierarchy. When a process running within the silo attempts to access an object via its name, the object manager may begin the search based on the silo's object manager root rather than the global system object manager root. The silo object manager hierarchy may and often will have links back to the system object manager hierarchy. The creator of the silo may determine what links within the system object manager hierarchy are to be exposed to the silo. When a process running within the silo creates a new object, the new object is created within the silo's object manager name space.

Thus the global name space for resources may be overridden by a silo-specific version of the name space (a branch of the system (global) hierarchy for the object manager, an independent hierarchy for the registry, etc.) that restricts the access of processes within the silo to the resources to those appearing within the silo-specific hierarchy. Processes may be assigned to the silo based on characteristics associated with the process so that resources can be restricted for processes in the silo based on the process instead of based on the user running the process. Each silo may override portions of the global file system name space. Similarly each silo may override portions of the global registry name space or other name space. If the silo is a child silo, portions of the parent silo name spaces can be overridden by the child silo name space. For example, when a process such as process 208a, 208b etc. running within a silo (e.g., silo 204) attempts to access a particular part of the global object manager hierarchy, the access may be redirected to a silo-specific version of the global object manager hierarchy. Similarly, when a process such as process 208a, 208b etc. running within a silo (e.g., silo 204) attempts to access a particular part of the registry (e.g., a key in the registry), the access may be redirected to a silo-specific version of the registry key.

Figure 4A:
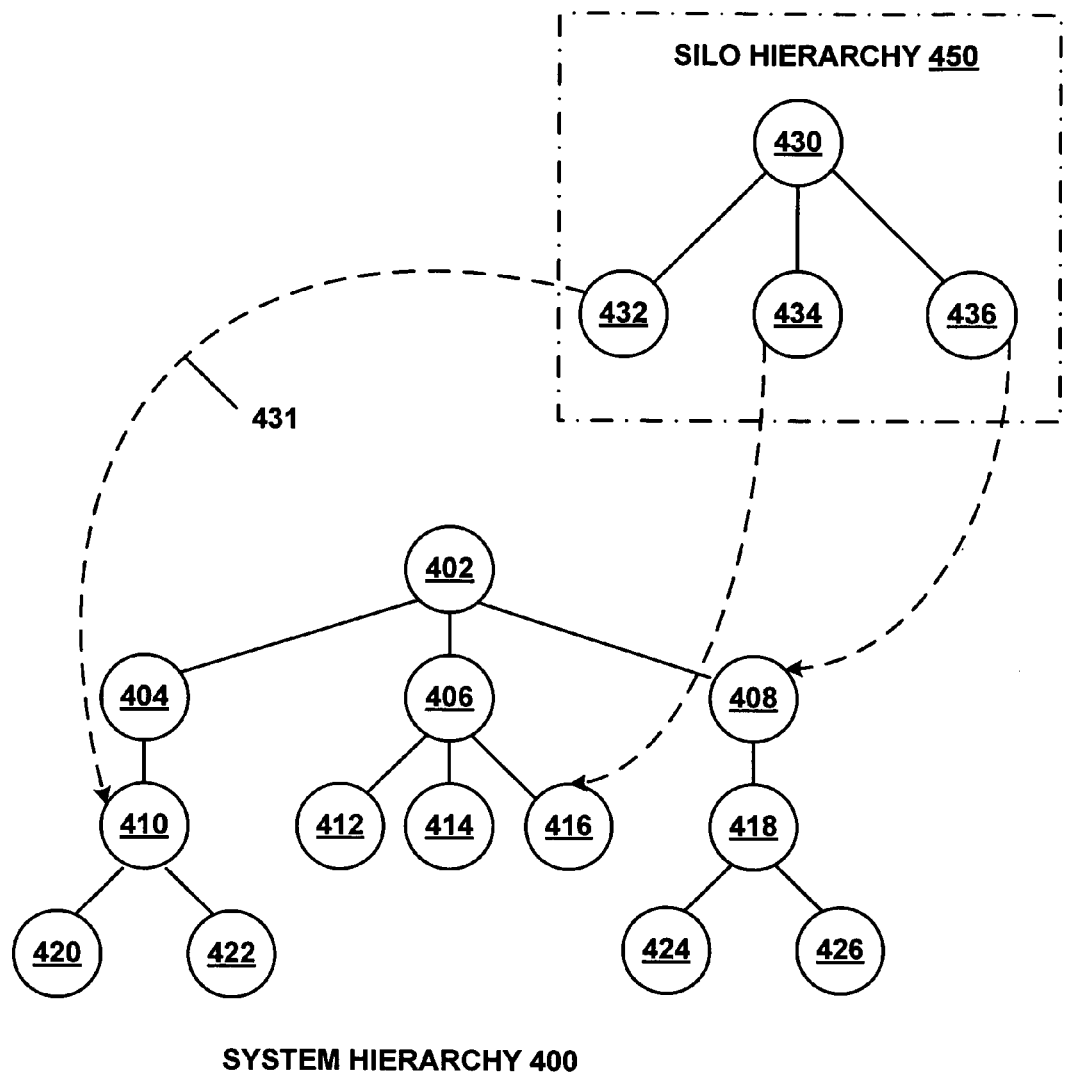
FIGS. 4a-d are block diagrams illustrating the creation of an alternative hierarchy in accordance with some embodiments of the invention.
Figure 4B:
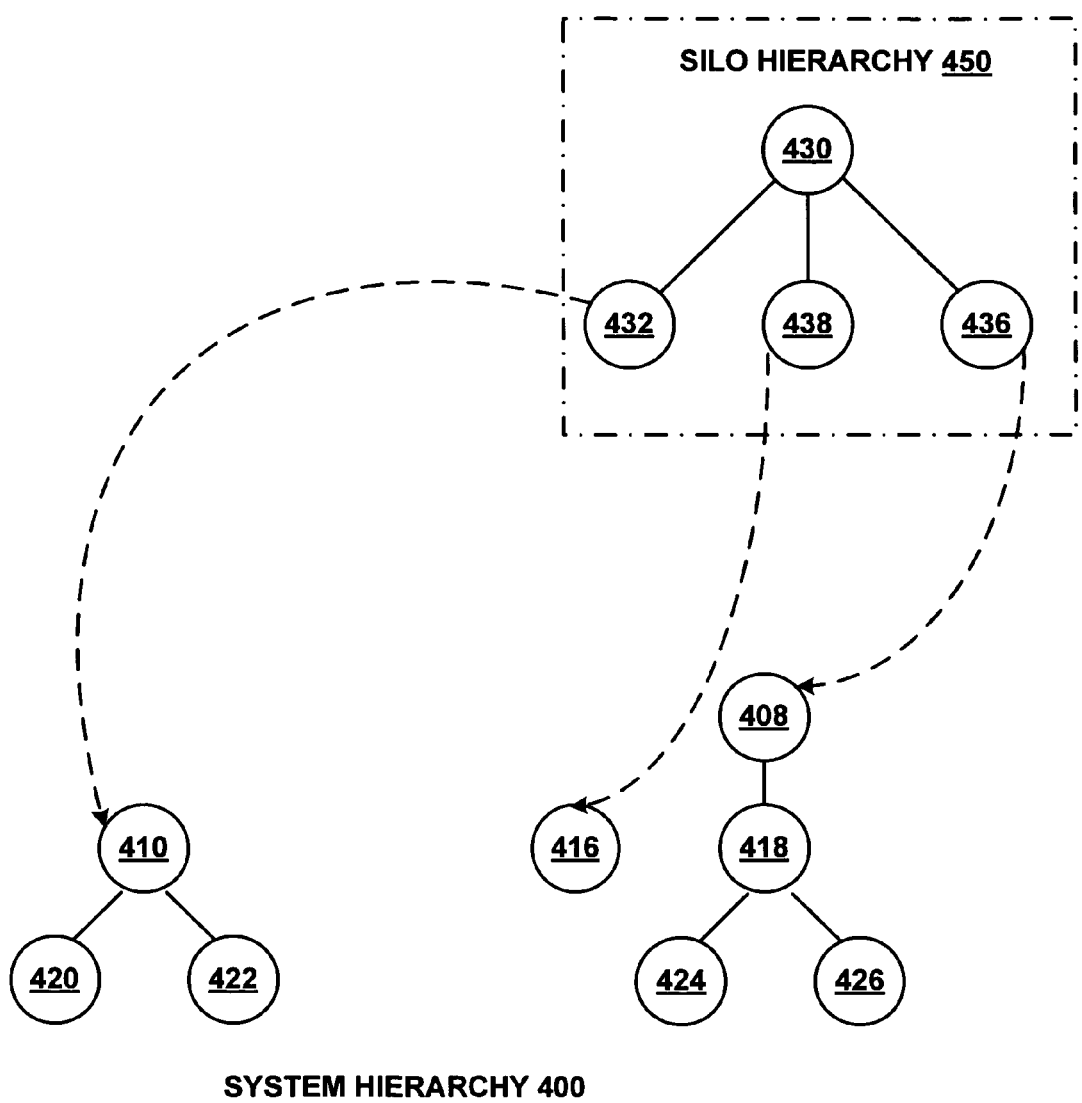
Figure 4C:
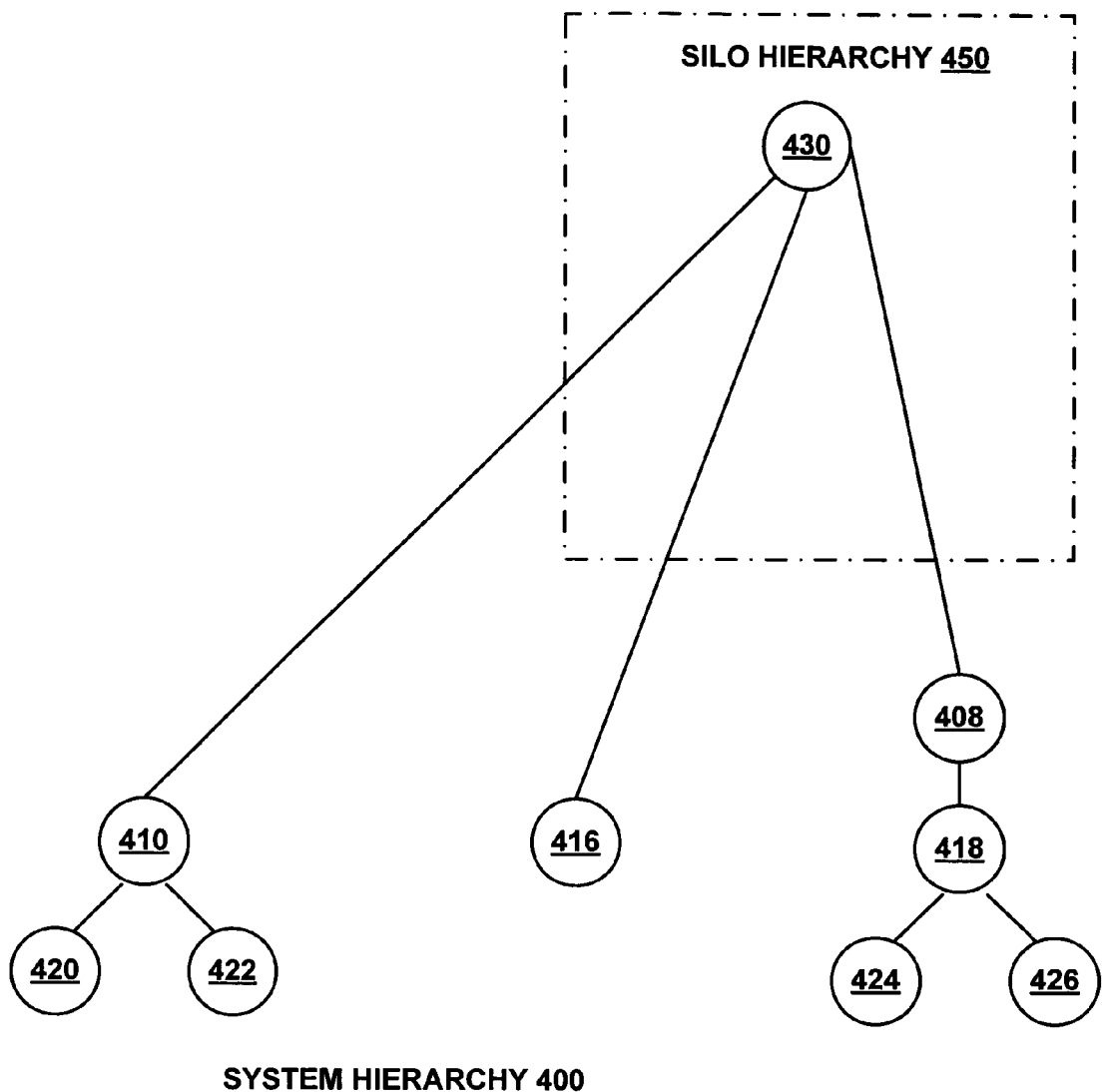
Figure 4D:
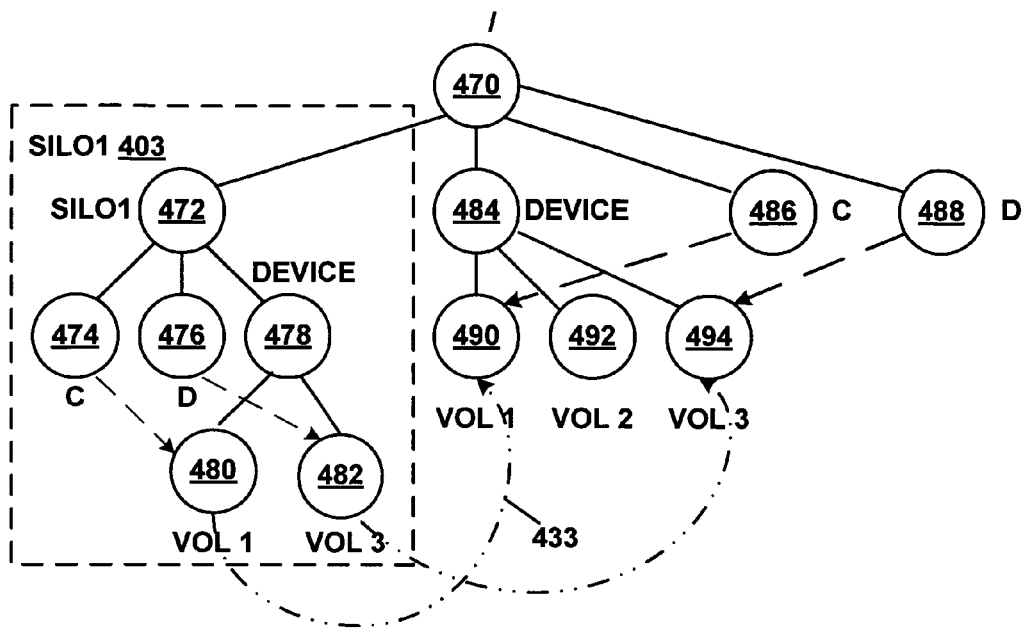
Figure 4E:
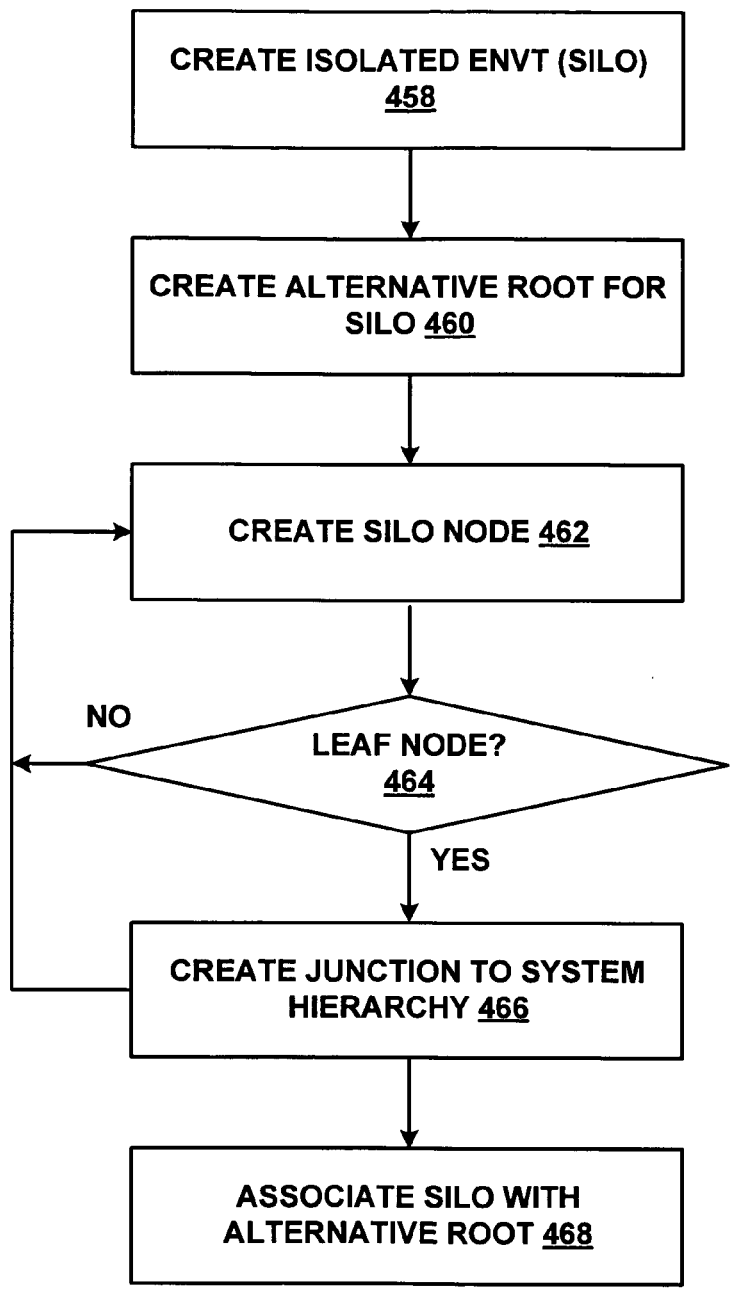
FIG. 4e is a flow diagram of a process for creating an alternative view of a global name space for an isolated environment in accordance with some embodiments of the invention.

FIG. 4e represents a flow diagram for creating an alternative view of a global name space for an isolated environment in accordance with some embodiments of the invention. FIGS. 4a-4d illustrate the creation of types of silo hierarchies for isolated environments. Referring now to FIG. 4e, at 458, an isolated environment (silo) is created. At 460 a root for a silo hierarchy is created. At 462 a node within the silo hierarchy is created. At 464, if the node is a leaf node, a junction to the physical hierarchy may be created (466). This process may be repeated for each node in the silo hierarchy. The silo hierarchy or silo root may be associated with the isolated environment (468). The silo hierarchy may be associated with the silo by, for example, setting the silo hierarchy to be the default registry for the silo.

FIG. 4e may also represent a flow diagram for creating an alternative view of a global name space for an isolated environment in which the view is created by adding a branch to an existing system hierarchy. That is, FIG. 4e may illustrate the creation of a silo branch of a system hierarchy for the isolated environment. Referring now to FIG. 4e, at 458, an isolated environment (silo) is created. At 460 a root for a silo hierarchy is created. At 462 a node within the silo hierarchy is created. At 464, if the node is a leaf node, a junction to the physical hierarchy may be created (466). This process may be repeated for each node in the silo hierarchy. The silo hierarchy is added to the system hierarchy and is associated with the isolated environment (468). The silo hierarchy may be associated with the silo by, for example, setting the silo branch to be the default object manager name space for the silo.

To illustrate the creation of a silo hierarchy, the following example is directed to the creation of a silo's view of the registry, but it will be understood that the process also applies to the creation of a view of other hierarchical name spaces. In FIG. 4a the tree structure outside of the dotted box illustrates an exemplary system or physical hierarchy 400, as it exists in volatile or non-volatile storage. Node 402 is the root node. Nodes 404, 406 and 408 represent child nodes of node 402. Nodes 404, 406 and 408 are first level nodes. Node 410 is a child node of node 404, nodes 412, 414 and 416 are child nodes of node 406 and node 418 is a child node of node 408. Nodes 410, 412, 414, 416 and 418 are second level nodes. Nodes 420 and 422 are child nodes of node 410 and nodes 424 and 426 are child nodes of node 418. Nodes 420, 422, 424 and 426 are third level nodes. System or physical hierarchy 400 may represent the global hierarchical registry for processes in the system environment 201 and may represent, for example, the following:

Node 402 may represent HKLM or HKEY_LOCAL_MACHINE
Node 406 may represent HARDWARE
Node 408 may represent SYSTEM
Node 410 may represent SOFTWARE
Nodes 412, 414 and 416 may represent CurrentControlSet, Setup, and WPA.

Silo hierarchy 450 (enclosed in the dotted box) may represent a silo-specific registry that may be created in memory (volatile storage) for a silo such as silo 204 of FIG. 3, created at step 458. Silo hierarchy 450 exists independently of system or physical hierarchy 400. System or physical hierarchy 400 is unaffected by the creation, use, or operations on silo hierarchy 450. An empty silo root node 430 is created (FIG. 4e, 460). Then silo hierarchy nodes are created (462). For example, in FIG. 4a, nodes 432, 434, and 436 may be created. Nodes may be created on one or more sub-root levels, but typically for a registry, only one level of sub-root nodes is created. For example, nodes 432, 434 and 436 are first level nodes. Junctions may then be created to the system or physical hierarchy (i.e., to the system registry in the example) in volatile storage (466). A junction may be created from a leaf node such as leaf node 432, leaf node 434 and/or leaf node 436 to a node in the underlying system or physical hierarchy, although it will be understood that a junction may be created at any level and may be located at nodes other than leaf nodes. For example, in silo hierarchy 450 a junction 431 (junctions are indicated in the figures by dashed arrows) extending from leaf node 432 of silo hierarchy 450 to node 410 of system or physical hierarchy 400 has been created, a junction from leaf node 434 of silo hierarchy 450 to node 416 of system or physical hierarchy 400 has been created, and a junction from leaf node 436 of silo hierarchy 450 to node 408 of system or physical hierarchy 400 has been created. It is not necessary to name nodes in the silo hierarchy the same as corresponding nodes in the system or physical hierarchy. For example, the node named WPA in physical hierarchy 400 may be named something else in silo hierarchy 450. FIG. 4b illustrates the effect of creation of the junctions.

FIG. 4c illustrates the resulting logical registry for silo 204. When a process in silo 204 accesses node 436 of the silo's registry 450, node 408 (e.g., SYSTEM of the system registry 400) will be accessed. Similarly, when a process in silo 204 accesses node 432 of the silo's registry 450, node 410 (e.g., SOFTWARE of the system registry 400) will be accessed. For example, suppose a process outside the silo requests an enumeration of the children of node 406 (HARDWARE). The list of keys will include child nodes 412, 414 and 416 (e.g., CurrentControlSet, Setup and WPA). A process inside the silo that makes the same request will return a list including only WPA because node 416 is the only child node of node 434 in silo hierarchy 450, hence creating a "view" of the global registry name space. Node 434 of the silo hierarchy 450 points to node 416 of the physical hierarchy 400. Furthermore, if a process in silo 204 attempts to access nodes 412 and 414 of physical hierarchy 400, the process will be unable to do so because that name is not able to be resolved in the process' name space. For example, if a process in silo 204 attempted to open the key represented by node 412 (e.g., CurrentControlSet, it will be unable to because the name cannot be resolved in the silo hierarchy (the silo's registry name space).

FIG. 4e may also represent a flow diagram for creating an alternative view of a global name space for an isolated environment in which the view is created by adding a branch to an existing system hierarchy. That is, FIG. 4e may illustrate the creation of a silo branch of a system hierarchy for the isolated environment. Referring now to FIG. 4e, at 458, an isolated environment (silo) is created. At 460 a root for a silo hierarchy is created. At 462 a node within the silo hierarchy is created. At 464 if the node is a leaf node, a junction to the physical hierarchy may be created (466). This process may be repeated for each node in the silo hierarchy. The silo hierarchy may be added to the system hierarchy and be associated with the isolated environment. The silo hierarchy may be associated with the silo by, for example, setting the silo branch to be the default object manager name space for the silo.

To illustrate the creation of such a silo hierarchy, the following example is directed to the creation of a silo object manager branch of a global object manager hierarchy, but it will be understood that the process also applies to the creation of a view of other hierarchical name spaces. In FIG. 4d the tree structure outside of the dotted box illustrates an exemplary system hierarchy 401, as it exists in volatile or non-volatile storage. Node 470 is the root node. Nodes 484, 486 and 488 represent child nodes of node 470. Nodes 484, 486 and 488 are first level nodes. Nodes 490, 492, and 494 are child nodes of node 484. Nodes 490, 492, and 494 are second level nodes. System hierarchy 401 may represent the global hierarchical object manager space for processes in the system environment 201 and may represent, for example, the following:

Node 470 may represent the top level (root) node of an object manager name space
Node 484 may represent the device
Node 486 may represent the C drive.
Node 488 may represent the D drive.
Nodes 490, 492 and 494 may represent hard disk volume 1, hard disk volume 2 and hard disk volume 3, respectively.

Silo branch 403 (enclosed in the dotted box) may represent a silo-specific branch of the object manager name space that may be created in memory (volatile storage) for a silo such as silo 204 of FIG. 3, created at step 458 and added to the system object manager name space. To create silo branch 403 an empty silo root node 472 is created (FIG. 4e, 460). Then silo hierarchy nodes are created (462). For example, in FIG. 4d, nodes 474, 476, and 478 representing the silo C drive, the silo D drive and the silo device may be created. Nodes 480 and 482 may be created representing the silo's hard disk volume 1 and the silo's hard disk volume 3 respectively. Nodes may be created on one or more sub-root levels. For example, nodes 474, 476 and 478 are first level nodes. Nodes 480 and 482 are second level nodes. Junctions between nodes 474 and 480 and between 478 and 482 are normal symbolic links. Junctions may then be created to the physical hierarchy (i.e., to the system object manager name space in the example) in volatile storage (466). A junction may be created from a leaf node such as leaf node 480 or leaf node 482 to a node in the system hierarchy. For example, in silo branch 403 a junction created via a silo-specific symbolic link such as symbolic link 433 extending from leaf node 480 of silo branch 403 to node 490 of system hierarchy 401 has been created, and a symbolic link junction from leaf node 482 of silo branch 403 to node 494 of system hierarchy 401 has been created. It is not necessary to name nodes in the silo branch the same as corresponding nodes in the system hierarchy. For example, the node named Hard disk VOL1 in global hierarchy 401 may be named HD VOL1 in silo branch 403. It will be appreciated that alternatively, an independent hierarchy may be created for the silo.

It will be appreciated that a junction from any node of a silo-specific hierarchy may be established to any node of a global hierarchy. Furthermore, it will be appreciated that any node in the system hierarchy that exists outside the silo branch will be unavailable to any process using the silo branch. For example, nodes 484, 486, 488 and 492 are unavailable to a process whose silo branch is silo branch 403. The effect of this process is that silo1's view of the global object manager's name space prohibits access of a process in the silo to hard disk volume 2. Furthermore, it will be appreciated that additional levels of nodes may exist between the branch root node and the leaf nodes in the silo branch. Although only four first level nodes are shown in FIG. 4d, any number of sub-root nodes may exist in a system hierarchy.

Each node in a silo-specific hierarchy may include one or more of the following pieces of information:

a pointer to a physical hierarchy node or a string representing the name of the physical hierarchy node
a linked list or other suitable data structure representing a set of children nodes for the node
an access mask. An access mask is a 32-bit value containing the permissions that are allowed or denied in the ACE (Access Control Entry), which is used in an ACL (Access Control List). When an object is opened, the Access Mask is used to request access rights.

Figure 5:
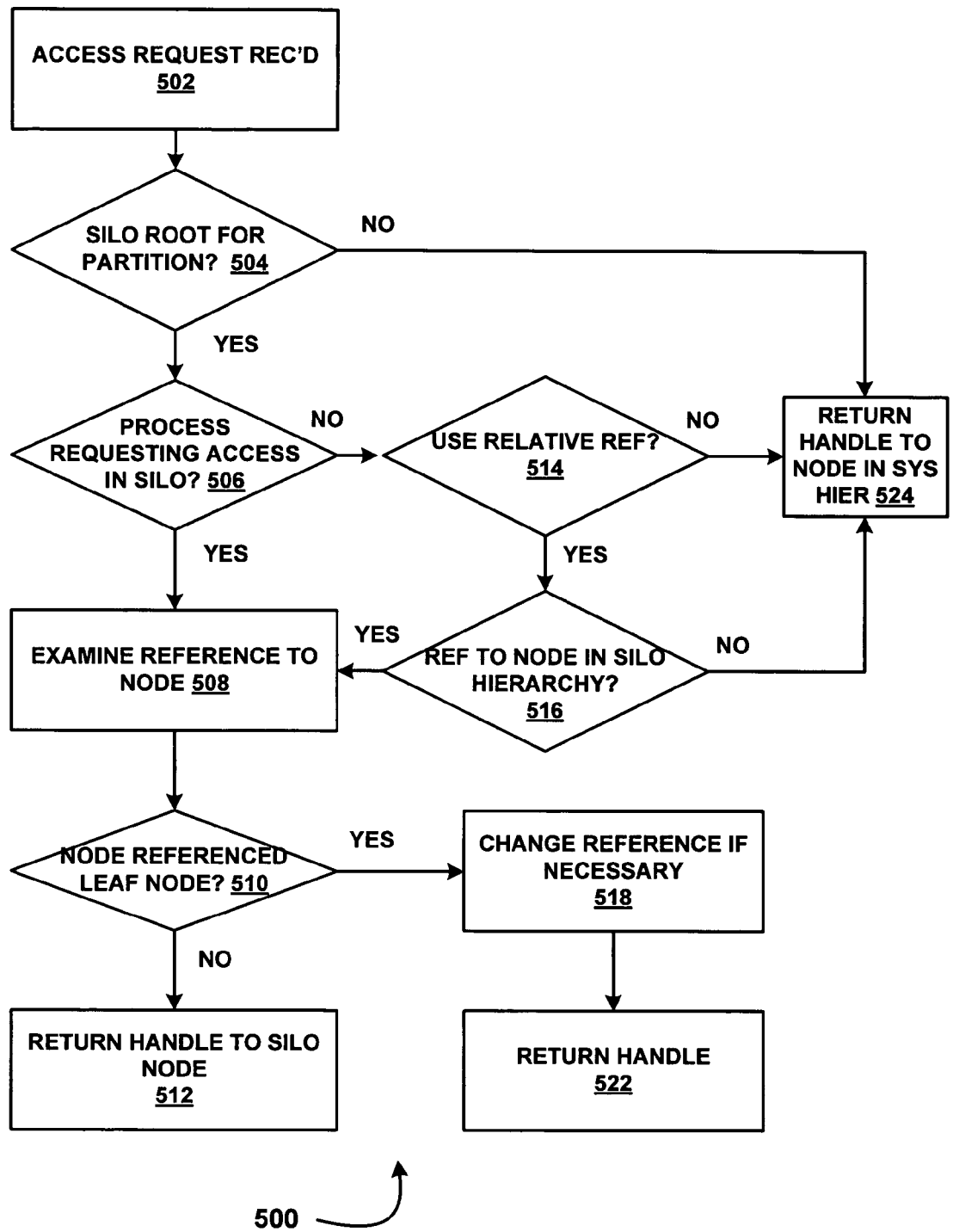
FIG. 5 is a flow diagram of a method of accessing a node in an alternative hierarchy in accordance with some embodiments of the invention.

FIG. 5 illustrates a process for accessing a node in a silo hierarchy, in accordance with some embodiments of the invention. At 502, a request for access to a node in a hierarchy is received. At 504, a check is made to determine if there is a silo hierarchy for the partition referenced. If there is no silo hierarchy for the partition, indicating that there is no special handling for this volume (i.e., no per silo root) then the existing physical partition is used and a handle is returned to a node in the appropriate system hierarchy in the appropriate partition at 524. If there is a silo hierarchy for the partition, processing continues at 506. At 506, it is determined whether the process requesting access is in a silo or not in a silo. In some embodiments of the invention, whether or not the process requesting the access is in a silo and in which silo the process resides can be determined by the contents of a field in the process structure although any suitable method of determining this is contemplated by the invention. In some embodiments of the invention, the process structure is stored in kernel memory which is inaccessible to the process, making it impossible for the process to access or change the silo-identifying field. If the process requesting access to the node is not a silo process, the statement requesting access is examined to determine whether the statement uses a relative reference to the node or an explicit reference to the node (514). If an explicit reference is used, a handle is returned to a node in the appropriate system hierarchy on the appropriate partition at 524. If a relative reference to the node is used, the reference is resolved to determine if the node being accessed is a node in the silo hierarchy (516). If the node is a node in the silo hierarchy the reference to the node is examined at 508. If the node being accessed is not a node in the silo hierarchy, a handle is returned to a node in the system hierarchy at 524.

At 510, if the node referenced is a node in the silo hierarchy and the node referenced is not a leaf node, a handle is returned to the silo node (512). If the node referenced is a leaf node, the name used to reference the node is changed to a name that can be resolved in the system hierarchy (if necessary) (518), and a handle to a node in the system hierarchy is returned (522). For example, suppose a request to access volume 2 is received. At 504 it may be determined that a silo (e.g., silo 204) exists. If the process requesting access to volume 2 is a process such as a process of system processes 250 (i.e., a process outside the silo), a handle to node 492 of FIG. 4d may be returned. If the process requesting access to volume 2 is a process such as process 208a (i.e., a process within the silo), the access request fails because volume 2 does not resolve within the silo-specific name space. Had the request been for access to volume 1, from a process in the system environment, a handle to node 490 would have been returned. An access request for volume 1 from a process inside the silo would resolve to node 480 which links to node 490. Access would be granted. Suppose node 480 of the silo branch is named VOLX. In this case, the name would have to be changed to Volume 1 in order to correctly be resolved in the system hierarchy.

Figure 6:
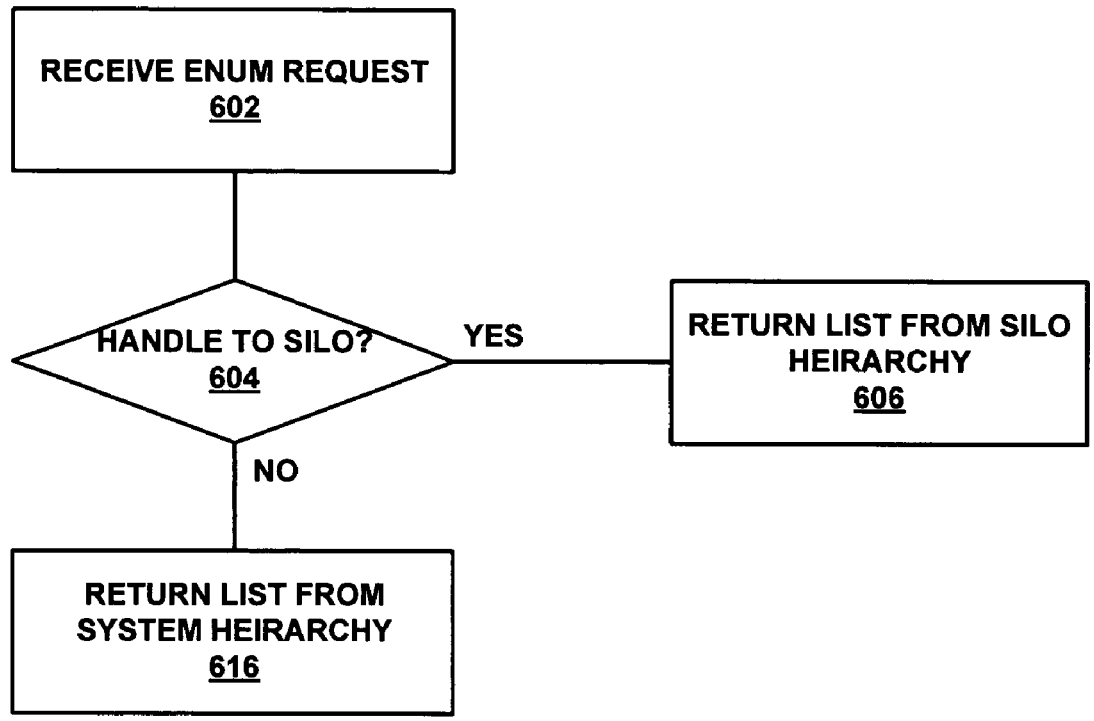
FIG. 6 is a flow diagram of a method of enumerating the nodes in a hierarchy in accordance with some embodiments of the invention.

FIG. 6 illustrates a process for enumeration of the child nodes of a particular node in accordance with some embodiments of the invention. At 602 an enumeration request is received. At 604, it is determined if the node for which the enumeration of child nodes is being requested is a node in a silo hierarchy, as for example, would occur if a process in a silo originated the request. If the node for which the enumeration is requested is a node in a silo hierarchy, the list of child nodes for the node in the silo hierarchy is returned at 606. If not, the list of child nodes for the system hierarchy is returned at 608. For example if the request: enumerate the child nodes of the device table were received from a process running in the silo, volume 1 and volume 3 would be returned. If the same request were received from a process running outside the silo, volumes 1, 2 and 3 would be returned. In this way, a process in a silo associated with a silo hierarchy can be constrained to see only a designated portion of the global name space.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for restricting access to resources comprising:
    a computer device comprising a processor;
    a memory in communication with the processor when the system is operational;
    computer instructions stored in the memory that upon execution by the computing device cause an operating system module to serve a system environment,
    the system environment associated with a global hierarchy comprising a plurality of nodes representing resources;
    the operating system creating an isolated environment within the system environment by controlling a view of the global hierarchy, the view constraining access of an entity executing in the isolated environment to a subset of the resources and;
    computer instruction stored in the memory that upon execution cause the operating system module to generate the view by creating a constrained-space-specific hierarchy in volatile storage only, the constrained-space-specific hierarchy not persisted to non-volatile storage and wherein the entity's sole access to the subset of the resources is via the constrained-space-specific hierarchy, the constrained-space-specific hierarchy comprising a subset of the plurality of nodes of the global hierarchy,
    wherein the global hierarchy represents a system object manager name space for the system environment,
    wherein the constrained-space-specific hierarchy represents a subset of the system object manager name space for the isolated environment,
    wherein at least one node in the constrained-space-specific hierarchy represents a link to a system object,
    wherein the view comprises a hierarchical arrangement distinct from an arrangement of the global hierarchy, such that the nodes of the distinct hierarchical arrangement have a subset nodes of the global hierarchy that are not dependant on one another.

2. The system of claim 1, wherein the entity comprises a process, group of processes, program, group of programs, application or group of applications.

3. The system of claim 1, wherein the isolated environment-specific hierarchy includes at least one node comprising a pointer to a resource.

4. The system of claim 1, wherein the isolated environment comprises at least one process executing in the isolated environment and wherein the constrained-space-specific hierarchy is a default hierarchy for the at least one process.

5. The system of claim 4, wherein the isolated environment-specific hierarchy restricts a set of resources available to the at least one process by restricting to a subset of the global physical hierarchy the view of the global physical hierarchy presented to the at least one process.

6. The system of claim 1, wherein the isolated environment is a silo.

7. The system of claim 1, wherein the isolated environment is a first isolated environment of a plurality of side-by-side isolated environments within the system environment.

8. The system of claim 1, wherein the isolated environment includes at least one level of nested isolated environments.

9. A method of providing a view of a global name space to an entity executing in an isolated environment comprising:
    generating on a computer system the isolated environment within a system environment via an operating system image, the operating system image serving the isolated environment and the system environment, the system environment associated with a global hierarchy in non-volatile storage and the isolated environment instantiated by a view of the global hierarchy in volatile storage; and generating on the computer system the view by creating a constrained-space-specific hierarchy that provides the entity access to only a subset of the global hierarchy, the isolated environment-specific hierarchy stored only in volatile storage,.

wherein the global hierarchy represents a system object manager name space for the system environment, wherein the constrained-space-specific hierarchy represents a subset of the system object manager name space for the isolated environment, wherein at least one node in the constrained-space-specific hierarchy represents a link to a system object, wherein the view comprises a hierarchical arrangement distinct from an arrangement of the global hierarchy, such that the nodes of the distinct hierarchical arrangement have a subset nodes of the global hierarchy that are not dependant on one another.

10. The method of claim 9, further comprising generating the constrained-space-specific hierarchy by:

creating an isolated environment-specific branch of the global hierarchy, wherein creating the branch comprises:

creating a root node for the isolated environment-specific hierarchy;

creating at least one level of nodes depending from the root node, wherein at least one node of at least one of the levels of nodes comprises a leaf node;

creating a symbolic link from the at least one leaf node to a node in the global hierarchy.

11. The method of claim 9, wherein the isolated environment is a silo.

12. The method of claim 9, further comprising nesting a child isolated environment within the isolated environment.

13. The method of claim 10, wherein the global hierarchy is a registry for the system environment and the isolated environment-specific hierarchy is a constrained-space specific registry for the entity executing in the isolated environment.

14. The method of claim 9, wherein the isolated environment is a first isolated environment of a plurality of side-by-side isolated environments.

15. The method of claim 9, wherein the entity comprises a process, a group of processes, an application or a group of applications.

16. A computer-readable storage medium comprising computer-executable instructions that upon execution on a computing device cause:

restricting a set of resources available to a process, group of processes, application or group of applications running in a silo by creating a silo hierarchy accessed by the process, the group of processes, the application or the group of applications, the silo hierarchy comprising a plurality of nodes at least one of which comprises a link to a global physical hierarchy comprising a plurality of physical nodes; and by use of the silo hierarchy, providing sole access to a node in the global physical hierarchy via a link from a node in the silo hierarchy to the node in the physical hierarchy, wherein the global hierarchy represents a system object manager name space for the system environment, wherein the silo hierarchy represents a subset of the system object manager name space for the isolated environment, wherein the silo hierarchical arrangement is distinct from an arrangement of the global hierarchy, such that the nodes of the distinct hierarchical arrangement have a subset nodes of the global hierarchy that are not dependant on one another.

17. The computer-readable medium of claim 16, comprising further computer-readable instructions for:

storing the silo hierarchy only in volatile storage and not in non-volatile storage.

18. The computer-readable medium of claim 16, wherein the computer-executable instructions comprise a portion of an operating system that serves the silo and a plurality of system processes external to the silo.

19. The computer-readable medium of claim 16, wherein the computer-executable instructions generate a registry.

* * * * *